July 18, 1972     K. J. McGUIRE     3,677,870
HEAT SHIELDS
Filed Aug. 22, 1969     2 Sheets-Sheet 1
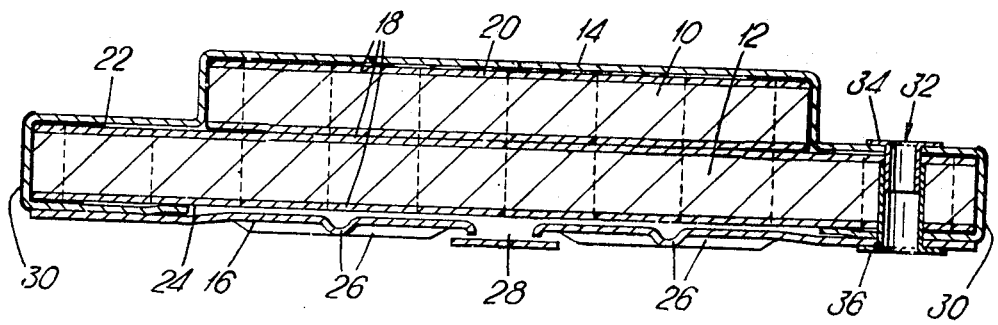
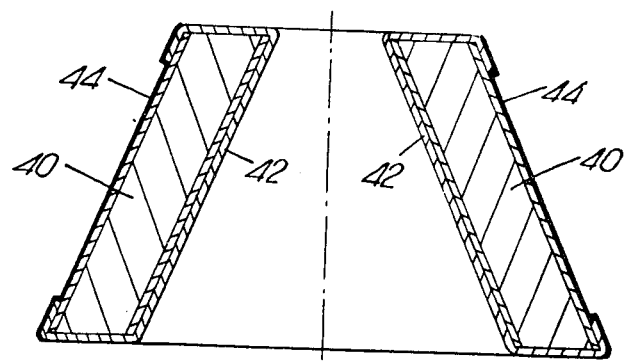

July 18, 1972 K. J. McGUIRE 3,677,870
HEAT SHIELDS
Filed Aug. 22, 1969 2 Sheets-Sheet 2
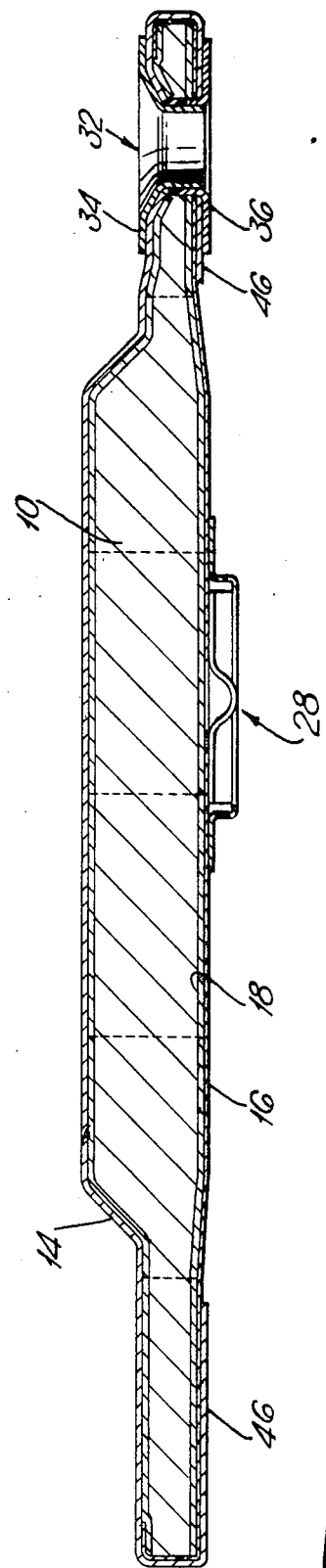

United States Patent Office 3,677,870
Patented July 18, 1972

3,677,870
HEAT SHIELDS
Kenneth John McGuire, Bedfordshire, England, assignor to Delaney Gallay Limited, Biggleswade, Bedfordshire, England
Filed Aug. 22, 1969, Ser. No. 852,401
Claims priority, application Great Britain, Mar. 28, 1968, 14,996/68; Sept. 13, 1968, 43,759/68
Int. Cl. B32b 3/04
U.S. Cl. 161—43  5 Claims

ABSTRACT OF THE DISCLOSURE

A heat shield, primarily intended for aerospace applications, comprising a mass of thermo-insulating material which is covered on one side by a thin metal skin and on the other side by a moulded sheath which extends round the edges of the shield and is bonded to the metal skin totally to enclose the insulating material. The heat shield can be fabricated or formed in any desired shape.

This invention relates to heat shields and in particular to those for use in aircraft.

Hitherto it has been the practice to form heat shields by enclosing a fibrous heat insulating material in a stainless steel pod by sealing the pod around its edges, e.g. by seam or spot welding. However, such heat shields have suffered from a number of disadvantages, inter alia they cannot be placed in contact with another metal surface, e.g. aluminium or other steel, without causing fretting between the two metals; furthermore in places where vibration or a high noise level is present, cracks tend to form in the region of the welds and there is a danger that fuel may lie in pools in the corrugations of the steel pod.

In accordance with the invention a heat shield comprises, a mass of thermo insulating material, a moulded sheet in the form of a sheath which covers at least one side of said mass, and a thin metal skin covering another side of said mass for strength and protection, the edges of said moulded sheet being attached by means of adhesive to the edges of said metal skin in order to completely and sealingly enclose said mass.

A heat shield in accordance with the invention can be placed without danger of fretting with the sheath adjacent to any kind of metal surface and is impervious and inert to aviation fuel, oil or hydraulic fluid. It can also withstand the temperature ranges which might be encountered in an aircraft, e.g. −30° C. to +250° C.

The sheet may comprise an impregnated glass fibre fabric, polytetrafluorethylene (P.T.F.E.) or a similar material having like properties. Where a glass fibre fabric is used it is of a weave which allows it to be moulded and is preferably impregnated with a fluorosilicon compound. It can also be coated with a layer of P.T.F.E. which is applied to the surface of the fabric by spraying to reduce still further any wear which may occur. Such a sheet can be moulded accurately on a former and retain its shape without having to be tailored to fit the complex shapes in which heat shields often have to be made in aircraft applications. It can also be bonded to itself by coating it with a standard adhesive.

Surfaces which are exposed to direct radiation or intense heat may advantageously be covered by metal or coated with a fluoro-elastomer or equivalent synthetic rubber sealant or coating such as that known as Viton (registered trademark) PR1750.

Where a P.T.F.E. covering is used, it may be necessary to tailor it to fit the shape of the insulating material. The covering can be bonded to itself after etching the two surfaces to be joined. In the case where the covering is P.T.F.E. no additional P.T.F.E. coating is required.

The metal layer can also be bonded to the sheath by means of an adhesive; thus there is no tendency for the metal to crack in the region of welds as in conventional heat shields in the form of pods.

Although there is little or no restriction as to the possible different configurations of heat shields in accordance with the invention, an important application of the invention is with respect to heat shields between the lower surfaces of an aircraft wing and an underslung engine. In such an embodiment, the heat shields may consist of a large number of smaller panels which are spaced to allow for various projections on the lower wing surface, against which the sheath is intended to abut. According to a further feature of the invention the mass of thermal insulating material is enclosed between a cover comprising two layers of glass fibre fabric and quilted by stitching to hold the insulating material evenly distributed over the whole area. One side of the cover may conveniently be bonded directly to the sheath by adhesive whilst the other side is bonded to the metal cladding.

Where a depression has to be formed in the heat shield the insulating material can be compressed, heavy duty press or air apperture can simply be punched or scooped out of it producing a further saving in weight.

In order to prveent loss of the insulating material from the edges of the sheets they are either dunked in a curable sealing solution, are bound with a suitable tape bonded to their covering fabric, or sprayed with a sealer. A suitable sealing solution is Viton (registered trademark) PR1730. If desired the whole surface of the fabric envelope which comes into contact with the outer sheath may advantageously be coated with Viton (registered trademark).

The invention will now be described by way of example with reference to the accompanying drawings, in which:

FIG. 1 is a section through a flat heat shield in accordance with the invention, FIG. 2 is a section through a heat shield having a single layer of insulating material; and FIG. 3 is a section through a frustro-conical heat shield in accordance with the invention.

The heat shield shown in FIG. 1 is of the type suitable for thermal insulation between the underside of an aircraft wing and an underslung engine. The shield comprises two layers 10, 12 of fibrous thermal insulation material enclosed between a moulded sheath 14 on its upper side and thin protective metal skin 16 on its underside as shown in the drawings.

The thermal insulating material, which is of the type known as MIN–K is supplied in a quilted form stitched between two layers 18 of glass fibre fabric. As the edges of the insulating material are liable to crumble they are dunked in a suitable sealant, such as Viton (registered trademark).

The two layers of thermal insulating material 10, 12 are bonded together and then secured by further stitching. The upwardly extending surfaces 20, 22 of the two layers 10, 12 are painted with Viton (registered trademark) PR1730 in order to protect and cover the stitching.

The sheath 14 comprises a fluoro-silicone impregnated glass fibre fabric or a sheet of P.T.F.E. which is moulded in an accurately made die to fit over the upper surface and enclose the sides of the heat shield without requiring any tailoring and bonded with adhesive to the undersurface 24 of the layer 12 of insulating material. The whole undersurface 24 is then coated with further adhesive and the thin protective metal skin 16 is attached. In order to increase the stiffness of the heat shield, the metal skin, which comprises stainless steel sheet in the order of 0.005 inch in thickness, is formed with corrugations 26. A vent 28 is also provided to allow entrapped air to escape as the heat shield attains its operation temperature, or water from condensation to drain.

Any edges or parts of the impregnated sheath 14 which in operation may be exposed to direct heat are painted with a layer 30 of Viton (registered trademark) PR1730 as a precaution against combustion. Where the sheath comprises a glass fibre fabric its surface 14 which in use is intended to about the lower surface of an aircraft wing is sprayed with P.T.F.E. solution in order to reduce friction between the metal of the wing and the impregnated sheath and thus reduce the consequent wear, this step is omitted where the sheath is formed of a sheet of P.T.F.E. material.

Bolt holes 32 may be formed in the heat shield by punching holes through the shield as desired and inserting co-operating studs 34, 36 through the hole from either side and bonding the two studs together with an adhesive.

When the heat shield is in position, any fuel which is spilt onto the shield or hydraulic fluid which leaks onto it drains at once and is not retained on the surface of the sheath 14. There is negligable wear due to fretting and the shield has a very much lower weight per square foot than a conventional shield.

The heat shield shown in FIG. 2 comprises a single mass of thermal insulating material 10 stitched between two layers 18 of fibre glass cloth. The insulating material is shaped by compressing it as required to impart to it the desired contour, and its edges are sprayed with a sealant. A thin metal skin 16 having a suitable vent 28 is then laid on the under surface of the shield (as shown) and bent round its side edges. A P.T.F.E. covering 14 is then wrapped around the upper part of the shield to form the sheath and an overlapping border 46 is bonded with adhesive to the metal skin. Where necessary the covering 14 can be tailored and bonded to itself after etching the two surfaces to be joined.

The shield shown in FIG. 3 has a frustro-conical form and is suitable for fitting in the region of a flange. It comprises a mass of thermo insulating material 40 covered on the inner side by a sheath 42 of impregnated glass fibre fabric moulded to fit snugly over the inner side and two end walls. A protective metal skin 44 is fitted over the outer surface and may include corrugations for stiffening, means for fixing the heat shield in position and vents as appropriate.

I claim:
1. A heat shield comprising
   (a) a mass of thermo insulating mouldable material,
   (b) a pre-formed glass fibre fabric or polytetrafluoroethylene sheet in the form of a unitary sheath which covers all but one side of said mass, and on said one side does form a lap seal which restrains (c), and
   (c) a thin metal skin covering said one uncovered side of said mass for strength and protection, the edges of said pre-formed sheet being attached by means of adhesive to the edges of said metal skin in order to completely and sealingly enclose said mass.
2. A heat shield according to claim 1 wherein said glass fibre material is coated with a film of polytetrafluoroethylene.
3. A heat shield according to claim 2 wherein said film of polytetrafluoroethylene is sprayed on the sheath.
4. A heat shield according to claim 1 in which some surfaces of said sheath are coated with a synthetic rubber sealant or coating.
5. A heat shield according to claim 1 wherein the edges of said thermo-insulating mass are sealed with a synthetic rubber sealant or coating.

References Cited
UNITED STATES PATENTS

| | | | |
|---|---|---|---|
| 3,168,426 | 2/1965 | Blackie | 161—189 X |
| 3,030,260 | 4/1962 | Metzler | 161—Teflon |
| 2,745,779 | 5/1956 | Ritter et al. | 161—44 |
| 2,674,015 | 4/1954 | Mautner | 161—39 |
| 1,864,055 | 6/1932 | Finkeldey | 161—104 |

ROBERT F. BURNETT, Primary Examiner

M. A. LITMAN, Assistant Examiner

U.S. Cl. X.R.

161—44, 93, 99, 149, 189, 216